(12) United States Patent
Hu et al.

(10) Patent No.: US 12,457,184 B2
(45) Date of Patent: Oct. 28, 2025

(54) METHOD, APPARATUS AND ELECTRONIC DEVICE OF INFORMATION DISPLAYING

(71) Applicant: Beijing Zitiao Network Technology Co., Ltd., Beijing (CN)

(72) Inventors: Junxiao Hu, Beijing (CN); Zhaoyuan Peng, Beijing (CN); Bowen Shen, Beijing (CN); Hongze Liu, Beijing (CN); Lei Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/526,835

(22) Filed: Dec. 1, 2023

(65) Prior Publication Data
US 2024/0121207 A1    Apr. 11, 2024

Related U.S. Application Data

(63) Continuation of application No. PCT/CN2022/100746, filed on Jun. 23, 2022.

(30) Foreign Application Priority Data

Jun. 25, 2021    (CN) .......................... 202110716551.8

(51) Int. Cl.
*H04L 51/216* (2022.01)
*G06F 40/279* (2020.01)
*H04L 51/224* (2022.01)

(52) U.S. Cl.
CPC .......... *H04L 51/216* (2022.05); *G06F 40/279* (2020.01); *H04L 51/224* (2022.05)

(58) Field of Classification Search
CPC ... H04L 51/216; H04L 51/224; H04L 51/046; G06F 40/279; G06F 9/451; G06F 9/542;
(Continued)

(56) References Cited

U.S. PATENT DOCUMENTS 8,543,655 B1    9/2013 Smith
8,725,813 B2 *  5/2014 Nalliah ................. G06F 3/0482
                                                        709/204
(Continued)

FOREIGN PATENT DOCUMENTS

CN       105120065 A    12/2015
CN       105827501 A     8/2016
(Continued)

OTHER PUBLICATIONS

Google, "Search operators you can use with Gmail", 2019, pp. 1-4.
(Continued)

*Primary Examiner* — Tonia L Dollinger
*Assistant Examiner* — Mehulkumar J Shah
(74) *Attorney, Agent, or Firm* — Astute IP Law Group

(57) ABSTRACT

Embodiments of the present disclosure discloses a method of information displaying, apparatus and an electronic device. The method comprises: displaying at least two session screening identifications in a first display area of a first message page, the at least two session screening identifications comprising: a first screening identification for indicating that a new message in a session is notified with a first notification strategy, and a second screening identification for indicating that a new message in the session is notified with a second notification strategy; and displaying information of each session corresponding to a currently selected session screening identification in a second display area of a second message page. The method may only display sessions that match user requests, reducing operations of users searching for required sessions in all sessions lists and saving time for users to browse required sessions.

19 Claims, 5 Drawing Sheets

(58) Field of Classification Search
CPC .............. G06F 9/546; G06F 2209/545; G06F 2209/547; G06F 9/54
See application file for complete search history.

(56) References Cited

U.S. PATENT DOCUMENTS

| | | | |
|---|---|---|---|
| 9,455,942 B2* | 9/2016 | Vendrow | ................. H04L 51/02 |
| 2005/0262199 A1 | 11/2005 | Chen et al. | |
| 2006/0031361 A1 | 2/2006 | Bailey et al. | |
| 2007/0174407 A1 | 7/2007 | Chen et al. | |
| 2008/0109739 A1* | 5/2008 | Khan | .................... G06F 40/186 715/762 |
| 2010/0082759 A1 | 4/2010 | Nalliah et al. | |
| 2013/0212490 A1* | 8/2013 | Scherpa | ............... G06Q 10/101 715/753 |
| 2015/0222572 A1 | 8/2015 | Vendrow et al. | |
| 2016/0380937 A1 | 12/2016 | Murphy et al. | |
| 2017/0017638 A1 | 1/2017 | Satyavarta et al. | |
| 2017/0075952 A1 | 3/2017 | Hartwell et al. | |
| 2017/0134316 A1 | 5/2017 | Cohen et al. | |
| 2020/0272324 A1* | 8/2020 | Chanda | ............... G06F 3/04883 |
| 2021/0110440 A1* | 4/2021 | Dion | .................... G06Q 30/018 |
| 2021/0382562 A1* | 12/2021 | Hassan | ............... G06F 3/04815 |
| 2023/0132663 A1 | 5/2023 | Rhee et al. | |

FOREIGN PATENT DOCUMENTS

| | | | |
|---|---|---|---|
| CN | 106575396 A | 4/2017 | |
| CN | 106775268 A | 5/2017 | |
| CN | 102685028 B | 1/2018 | |
| CN | 107533417 A | 1/2018 | |
| CN | 108632127 A | 10/2018 | |
| CN | 109039862 A | 12/2018 | |
| CN | 109086117 A | 12/2018 | |
| CN | 109697100 A | 4/2019 | |
| CN | 110032417 A | 7/2019 | |
| CN | 110046013 A | 7/2019 | |
| CN | 105227444 B | 8/2019 | |
| CN | 110138652 A | 8/2019 | |
| CN | 111158831 A | 5/2020 | |
| CN | 111277637 A | 6/2020 | |
| CN | 111309937 A | 6/2020 | |
| CN | 108289079 B | 7/2020 | |
| CN | 111756615 A | 10/2020 | |
| CN | 112099700 A | 12/2020 | |
| CN | 112947823 A * | 6/2021 | ......... G06F 3/04842 |
| CN | 114461313 A | 5/2022 | |
| CN | 114461314 A | 5/2022 | |
| JP | 2017-211968 A | 11/2017 | |

OTHER PUBLICATIONS

Stack Exchange, "Searching within Gmail's nested labels", 2016, p. 1.
International Search Report in PCT/CN2022/100746, mailed Aug. 4, 2022, 4 pages.
International Search Report in PCT/CN2022/100886, mailed Aug. 31, 2022, 3 pages.
Office Action in CN202110716204.5, mailed Mar. 1, 2023, 6 pages.
Office Action in CN202110716551.8, mailed Mar. 23, 2023, 9 pages.
Aamoth, "Gmail Tips: Get Organized with Labels and Filters", Time, Oct. 6, 2014, 7 pages.
Nowakowski et al., "New in Labs: Preview Pane", "New in Labs: Auto-advance to the next conversation", Official Gmail Blog, Oct. 26, 2010/Aug. 4, 2011, 6 pages.
Raphael, "How to use Gmail labels to tame your inbox", Gmail for Buisness, IDG, Nov. 2019/Apr. 21, 2023, 8 pp. 1-8.
Office Action received for Chinese Patent Application No. 202110716551.8, mailed Dec. 29, 2023, 16 pages.
Notification to Grant Patent Right for Invention for Chinese Patent Application No. 202110716551.8, mailed on May 28, 2024, 6 pages.
Office Action for Japanese Patent Application No. 2023-572543, mailed on Dec. 17, 2024, 18 pages.
Notice of Allowance for U.S. Appl. No. 18/516,776, mailed on Jan. 13, 2025, 9 pages.
Notice of Allowance for U.S. Appl. No. 18/516,776, mailed on Apr. 15, 2025, 7 pages.

* cited by examiner

```
┌─────────────────────────────────────────────────────────────────────┐
│ DISPLAY AT LEAST TWO SESSION SCREENING IDENTIFICATIONS IN A FIRST   │
│ DISPLAY AREA OF A FIRST MESSAGE PAGE, THE AT LEAST TWO SESSION      │── 101
│ SCREENING IDENTIFICATIONS COMPRISING: A FIRST SCREENING             │
│ IDENTIFICATION FOR INDICATING THAT A NEW MESSAGE IN A SESSION IS    │
│ NOTIFIED WITH A FIRST NOTIFICATION STRATEGY, AND A SECOND           │
│ SCREENING IDENTIFICATION FOR INDICATING THAT A NEW MESSAGE IN       │
│ THE SESSION IS NOTIFIED WITH A SECOND NOTIFICATION STRATEGY         │
└─────────────────────────────────────────────────────────────────────┘
                                  │
                                  ▼
┌─────────────────────────────────────────────────────────────────────┐
│ DISPLAY INFORMATION OF EACH SESSION CORRESPONDING TO A CURRENTLY    │── 102
│ SELECTED SESSION SCREENING IDENTIFICATION IN A SECOND DISPLAY AREA  │
│ OF A SECOND MESSAGE PAGE                                            │
└─────────────────────────────────────────────────────────────────────┘
```

FIG. 1

```
┌─────────────────────────────────────────────────────────────────────┐
│ DISPLAY AT LEAST TWO SESSION SCREENING IDENTIFICATIONS IN A FIRST   │
│ DISPLAY AREA OF A FIRST MESSAGE PAGE, THE AT LEAST TWO SESSION      │── 201
│ SCREENING IDENTIFICATIONS COMPRISING: A FIRST SCREENING             │
│ IDENTIFICATION FOR INDICATING THAT A NEW MESSAGE IN A SESSION IS    │
│ NOTIFIED WITH A FIRST NOTIFICATION STRATEGY, AND A SECOND           │
│ SCREENING IDENTIFICATION FOR INDICATING THAT A NEW MESSAGE IN       │
│ THE SESSION IS NOTIFIED WITH A SECOND NOTIFICATION STRATEGY         │
└─────────────────────────────────────────────────────────────────────┘
                                  │
                                  ▼
┌─────────────────────────────────────────────────────────────────────┐
│ DISPLAY INFORMATION OF EACH SESSION CORRESPONDING TO A CURRENTLY    │── 202
│ SELECTED SESSION SCREENING IDENTIFICATION IN A SECOND DISPLAY AREA  │
│ OF A SECOND MESSAGE PAGE                                            │
└─────────────────────────────────────────────────────────────────────┘
                                  │
                                  ▼
┌─────────────────────────────────────────────────────────────────────┐
│ RECEIVE A CHANGE OPERATION PERFORMED ON AT LEAST ONE TARGET         │
│ SESSION BY A USER, THE CHANGE OPERATION BEING FOR CHANGING A        │── 203
│ SCREENING IDENTIFICATION CORRESPONDING TO A TARGET SESSION, AND     │
│ CHANGE THE SCREENING IDENTIFICATION CORRESPONDING TO THE AT         │
│ LEAST ONE TARGET SESSION TO A FIRST TARGET SCREENING                │
│ IDENTIFICATION INDICATED BY THE CHANGE OPERATION                    │
└─────────────────────────────────────────────────────────────────────┘
```

FIG. 2

METHOD, APPARATUS AND ELECTRONIC DEVICE OF INFORMATION DISPLAYING

CROSS-REFERENCE OF RELATED APPLICATIONS

This application is a continuation of International Patent Application No. PCT/CN2022/100746, filed on Jun. 23, 2022, which claims the benefit of Chinese patent application No. 202110716551.8 filed on Jun. 25, 2021, entitled "METHOD, APPARATUS AND ELECTRONIC DEVICE OF INFORMATION DISPLAYING", which is hereby incorporated by reference in its entirety.

FIELD

The present disclosure relates to the field of the Internet, and more particularly to a method, apparatus and an electronic device of information displaying.

BACKGROUND

With instant messaging applications, users may communicate with other users in real time. The same user may use instant messaging applications to communicate with multiple contacts.

The session in instant messaging may be a session for information interaction with a single contact, or a session for information interaction with multiple contacts in a group at the same time.

SUMMARY

Summary of the present disclosure is provided to briefly introduce the concepts, which will be further described in detail in Detailed Descriptions. The Summary of the present disclosure is not intended to identify key or essential features of the claimed technical solution. The Summary of the present disclosure is not to limit the scope of the claimed technical solution.

The present disclosure provides a method, apparatus and electronic apparatus of information displaying.

In a first aspect, embodiments of the present disclosure provide a method of information displaying. The method comprises: displaying at least two session screening identifications in a first display area of a first message page, the at least two session screening identifications comprising: a first screening identification for indicating that a new message in a session is notified with a first notification strategy, and a second screening identification for indicating that a new message in the session is notified with a second notification strategy; and displaying information of each session corresponding to a currently selected session screening identification in a second display area of a second message page.

In a second aspect, embodiments of the present disclosure provide an information display apparatus. The information display apparatus comprises: a first display unit for displaying at least two session screening identifications in a first display area of a first message page, the at least two session screening identifications comprising: a first screening identification indicating that a new message in a session is notified with a first notification strategy, and a second screening identification indicating that a new message in the session is notified with a second notification strategy; and a second display unit for displaying information of each session corresponding to a currently selected session screening identification in a second display area of a second message page.

In a third aspect, embodiments of the present disclosure provide an electronic device. The electronic device comprises: one or more processors; a memory for storing one or more programs, which, when executed by the one or more processors, cause the one or more processors to implement a method according the first aspect.

In a fourth aspect, embodiments of the present disclosure provide a computer-readable storage medium. The computer-readable storage medium having a computer program stored thereon, characterized in that, the program, when executed by a processor, implements the method according to the first aspect.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, the same or similar reference signs indicate the same or similar elements. It should be understood that the drawings are illustrative and that the originals and elements are not necessarily drawn to scale.

FIG. 1 is a flowchart of the method of information displaying according to some embodiments of the present disclosure;

FIG. 2 is a flowchart of the method of information displaying according to some other embodiments of the present disclosure;

DETAILED DESCRIPTION

Figure 3:
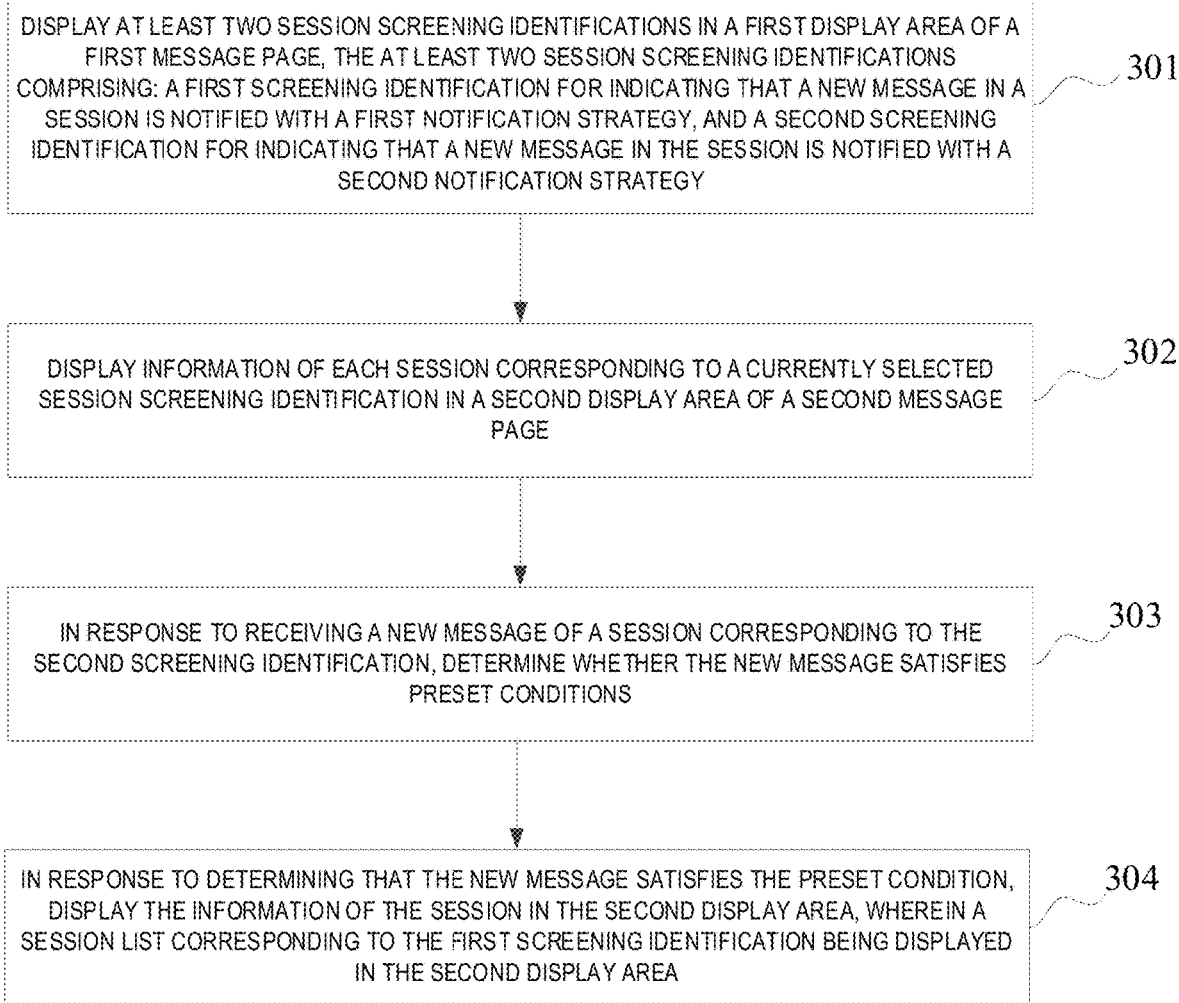
FIG. 3 is a flowchart of the method of information displaying according to some further embodiments of the present disclosure.

Embodiments of the present disclosure will be described in more detail with reference to the accompanying drawings hereinafter. Although some embodiments of the present disclosure are shown in the drawings, it should be understood that the present disclosure may be implemented in various forms and should not be construed as limited to embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

In the description of embodiments of the present disclosure, the term "comprise(s)" and similar terms shall be understood as open inclusion, that is, "including but not limited to". The term "based on" is to be understood as "based at least in part on". The term "one embodiment" is to be understood as "at least one embodiment". The term "another embodiment" is to be understood as "at least one other embodiment". The term "some embodiments" is to be understood as "at least some embodiments". Other explicit and implicit definitions may also be comprised below.

It is to be noted that the concepts "first", "second" and the like used herein are only used to distinguish different apparatuses, modules or units, and they do not limit the order or the interdependence of functions performed by these apparatuses, modules or units.

It is to be noted that the expression "one" and "more" used herein are only for the purpose of illustrations rather than limitations, and those skilled in the art would understand that they are to be understood as "one or more" unless otherwise clearly indicated in the context.

Names of messages or information interacted between multiple apparatuses in the embodiment of the present disclosure are only for the purpose of illustrations and are not for the purpose of limiting the scope of these messages or information.

Please refer to FIG. 1, which shows a flowchart of a method of information displaying according to an embodiment of the present disclosure. The method of information displaying as shown in FIG. 1 comprises the following steps.

Step 101, displaying at least two session screening identification in a first display area of a first message page, the at least two session screening identification comprising: a first screening identification for indicating that a new message in a session is notified with a first notification strategy, and a second screening identification for indicating that a new message in the session is notified with a second notification strategy.

Step 102, displaying information of each session corresponding to a currently selected session screening identification in a second display area of a second message page.

The method, apparatus and electronic device of information displaying provided in the present disclosure, by displaying at least two session screening identifications in a first display area of a first message page, the at least two session screening identifications comprising: a first screening identification indicating a first notification strategy for notifying new messages in a session, and a second screening identification indicating a second notification strategy for notifying new messages in a session; displaying information of each session corresponding to the currently selected session screening identification in the second display area of the second message page, realizing screening of sessions according to session screening identification corresponding to different notification strategies. When the session information is displayed in the above scheme, only the session screening identification corresponding to the selected session by the user is displayed. Compared with the way of displaying all the session lists at the same time, the method of information displaying proposed in this scheme may only display sessions that match the user request, reducing the operation of the user searching for the required session in the entire session list, saving the time for the user to browse the required session.

In this embodiment, the execution subject of the method of information displaying may be a user's terminal device, or it may be an instant messaging client installed on a user's terminal device, or it may be a server. Among them, the instant messaging client may comprise a client with an instant messaging function, for example, in a client application for browsing short videos or graphic information, if there is an instant messaging function, it also belongs to the instant messaging client of the present disclosure.

Users may open the message page on the terminal device, for example, the message page may be opened through the instant messaging client installed on the terminal device. The message page here may be, for example, a message display page of an instant messaging application. For example, a default message display page of the instant messaging application.

Specifically, users may log in to the instant messaging client, and may open the message page after logging in to the instant messaging client.

At least two session screening identifications may be displayed in the first display area of the opened first message page. Users may perform a selection operation on a session screening identification in the at least two session screening identifications, and information of each session corresponding to a currently selected session screening identification may be displayed in the second display area of the second message page.

In some application scenarios, the first message page and the second message page may be the same message page. In these application scenarios, the first display area may be above the second display area.

In other application scenarios, the first message page and the second message page may also be different pages. That is, the first message page and the second message page are pages that are independent of each other. Optionally, session information pages of different screening identifications may be independent second pages.

In these application scenarios, the first display area in the first message page may display at least two session screening identifications. Users may perform a selection operation on the at least two displayed session screening identifications in the first message page. After users perform the selection operation, the second page may be displayed. The second page displays information of each session corresponding to the session screening identification selected by the user's current selection operation. The second page may comprise a return control for indicating return of the first message page. When the second page is displayed, users may switch the currently displayed second page to the first page through the return control.

The first display area may display a first screening identification and a second screening identification. In some application scenarios, the first display area may also display other screening identifications.

In the first display area, the first screening identification and the second screening identification may be arranged laterally sequentially. Optionally, the arrangement order corresponding to the first screening identification may be a first arrangement order.

When the execution subject is a terminal device of a user, the above-mentioned session may be, for example, a session saved in the terminal device, or a session received by the user's terminal device. If the execution subject is a server, the above-mentioned session may be, for example, a session that sends messages to a user, or a session that sends messages to other contacts for the user.

The above session may comprise a session for information interaction with a single contact and a session for information interaction with multiple contacts. A session for information interaction with a single contact may be regarded as a contact session, and a session for information interaction with multiple contacts at the same time may be regarded as a group session.

Each session screening identification may correspond to at least one session.

The first screening identification indicates that a new message in a session is notified with a first notification strategy. The second screening identification indicates that the new message in the session is notified with a second notification strategy.

The notification frequency of the first notification strategy is higher than the notification frequency of the second notification strategy.

According to the notification strategy, multiple sessions may be grouped. The obtained different groups correspond to different notification strategies. Users may select a screening identification in the first display area of the first message page, and the second message page may display session information corresponding to the screening identification. In a session list corresponding to the currently selected screening identification displayed in the second display area of the second message page, latest session information may be displayed. The latest session information comprises a summary of the latest news and the time of receiving or sending the latest news. In addition, each session information in the session list may be displayed in reverse order from top to bottom in the second message page according to the time of receiving the latest message for each session. The messages with the shortest time interval between reception time of the latest message and the current time is arranged at the top of the session list. In the second message page, information of each session as displayed is updated in real time according to the currently received message of each session. For example, a user has a total of ten sessions: A, B, C, D, E, F, G, H, I, and J. The first screening identification may correspond to five sessions of A, B, C, E, and F. The second screening identification may correspond to five sessions of D, G, H, I, and J. Of course, if a session satisfies the screening conditions corresponding to two screening identifications at the same time, the session may correspond to two screening identifications at the same time. The user may select the first screening identification as the currently selected screening identification, and the session list displayed in the second display area of the message display page is the information of five sessions of A, B, C, E, and F. If the receiving time of their latest messages is A at 20:00 yesterday, B at 10:10 today, C at 9:30 today, E at 10:00 today, and F at 10:15 today. Then in the second message page, the order of the sessions from top to bottom is: F, B, E, C, A. In the second message page, information of the latest session of the sessions may also be displayed.

The session list corresponding to the screening identification comprises information of each session under the screening identification. After a user selects the screening identification corresponding to a notification strategy as the selected screening identification, the session list corresponding to the screening identification may be displayed in the second display area to eliminate interference caused by messages of sessions corresponding to other notification strategies.

In some optional implementations, the first notification strategy is that all messages of the session are notified in real time, and the second notification strategy is that all messages of the session are not notified in real time.

In these optional implementations, when a new message is received by the session corresponding to the first screening identification, the new message will be notified in real-time.

As an implementation, when the session corresponding to the first screening identification receives a new message, if information of the session corresponding to the first screening identification is currently displayed in the second display area, information of the new message received by the session is displayed in the second display area. If information of the session corresponding to other screening identification is currently displayed in the second display area, notification information of the new message received for the session may be displayed. The above notification information may be displayed in the second display area or other display areas of the second message page in any display style, such as displaying the above notification information in a pop-up window or floating window mode. In this way, regardless of which screening identification corresponding session is currently displayed in the second display area, when receiving a new message, the session corresponding to the first screening identification may receive prompt information of the received new message, which may prevent users from missing the message processing time due to not being able to read important new messages in time.

When the session corresponding to the first screening identification receives a new message, if information of the session corresponding to the first screening identification is currently displayed in the second display area, displaying the information of the new message received by the session in the second display area comprises: adding or updating prompt information of the received new message at an identification of the session; displaying summary information of the received new message and time information of sending or receiving the new message in the display area of the session. The identification of the session may comprise graphics, images, or text used to characterize the session. For example, adding the prompt information of the received new message to the identification of the session may be adding, after receiving the new message, an identification indicating that a new message is received at the identification of the session. The identification of the received new message may comprise, for example, a text identification, a graphic identification, etc. The graphic identification may comprise a color identification, etc. Updating the prompt information of the received new message at the identification of the session comprises increasing the number of unread messages displayed in the session identification area.

In these optional implementations, when a new message is received by the session corresponding to the second screening identification, the new message is not notified in real time. That is, when a message corresponding to any session of the second screening identification is received, the new message may not be displayed and notified in the second display area. This means that the session corresponding to the second screening identification is not so important or does not need to be processed in a timely manner for users.

In some application scenarios, if information of the session of a non-second screening identification is displayed in the second display area, the received new message of the session corresponding to the second screening identification the second display area may not be notified in the second display area, in order to avoid disturbing the information of the session of other screening identification. The second screening identification is an identification for indicating that a new message in the session is notified with the second notification strategy, and the non-second screening identification may comprise a first screening identification for indicating that a new message in a session is notified with the first notification strategy, or other screening identification other than the first screening identification and the second screening identification.

In some other application scenarios, if the second display area displays information of the session of the second screening identification, summary information of the new message and time information of sending/receiving the information message are displayed in the area of the second display area where the session is displayed. When a user selects the second screening identification, the information of the session may be displayed in the message list of the second display area. Thus, the user may understand information of all sessions under the second screening identification.

In some other optional implementations, the first notification strategy is that all messages of the session are notified in real time, and the second notification strategy is that messages of the session meet a preset condition are notified in real time, and other messages that do not meet the preset condition are not notified in real time.

In these optional implementations, upon receiving a new message in the session corresponding to the first screening identification, the new message may be notified in real-time.

In some embodiments of the present disclosure, the real-time notification may be one or more of the following: a pop-up message notification when receiving a new message; a sound prompt message when receiving a new message; visual means such as flashing to prompt users when receiving a new message. Correspondingly, not performing real-time notification means not issuing notification information corresponding to a real-time notification.

New messages of the session corresponding to the second screening identification meeting a preset condition are notified in real-time, and new messages that do not meet the preset condition are not notified in real-time. On the one hand, for messages that satisfy the preset condition, a user may be notified in real time of receiving the message that satisfies the preset condition, so that the user may handle it in a timely manner. On the other hand, it may avoid disturbing the user when the message that does not satisfy the preset condition is displayed in the second display area. In some application scenarios, when a session corresponding to the second screening identification receives a new message that satisfies the preset condition, the session may provide a real-time notification of the received new message. The real-time notification may comprise an identification of the session, summary information of the new message, and time information for sending or receiving the new message. Displaying the identification of the session helps users understand the source of the message, the summary information of the message is displayed so that the user may timely understand the summary information of the new message. The above time information is convenient for users to grasp timing of processing the new message to avoid delaying the processing of the message.

The real-time notification of receiving the new message comprises displaying, in a second display area, a real-time notification of receiving the new message. When notifying the receipt of the new message in real-time, the second display area may display information of a session corresponding to other selected screening identification.

In some optional implementations, the above-described step 102 may comprise: if no selection operation of a user for the session screening identifications is detected, determining the first screening identification as a currently selected session screening identification by default.

In these optional implementations, when a user does not select a session screening identification, information of each session corresponding to the first screening identification is displayed in the second display area by default.

Thus, it is convenient to display information of each session corresponding to the first screening identification in the second display area, so that users know in real time the message of each session meeting the first notification strategy, and users may keep abreast of the received new message, thereby preventing users from missing important new information.

In some optional implementations, the session screening identification is determined based on the following steps.

First, at least one session is obtained.

Secondly, a notification strategy corresponding to each session is determined based on the attribute value of the notification attribute of the at least one session, wherein the notification strategy comprises a first notification strategy and a second notification strategy.

Finally, the session screening identification corresponding to each session is determined according to the notification strategy corresponding to each session, and each session is associated with its corresponding session screening identification.

Herein the session screening identification comprises a first session screening identification and a second session screening identification.

In these optional implementations, the above multiple interaction messages may comprise historical interaction messages or may also comprise currently received messages.

By setting the attribute value of the notification attribute of the session, the session may be automatically associated with the screening identification corresponding to the session.

The attribute value of the notification attribute of the session may comprise a first attribute value characterizing real-time notification of a new message in a session, a second attribute value characterizing not real-time notification of a new message in a session.

The attribute value of the notification attribute of the session may be an attribute value set in advance by a user, or may be a default attribute value.

In some application scenarios, the attribute value of a default notification attribute of the session characterizes the first attribute value for the session.

If the attribute value of the notification attribute of the session is the first attribute value, the session may be associated with the first screening identification.

If the attribute value of the notification attribute of the session is the second attribute value, the session may be associated with the second screening identification.

In the related technology, multiple sessions are displayed in a session list in a session flow of an instant messaging session interface. Information of different sessions in the session list may be arranged according to time of the latest messages as received. In this way, some unimportant sessions will also be arranged in front of more important ones due to receiving new messages, causing disturbance to users.

The method of information displaying provided in the present embodiment, by displaying at least two session screening identifications in a first display area of a first message page, the at least two session screening identifications comprises: a first screening identification for indicating that a new message in a session is notified with a first notification strategy, and a second screening identification for indicating that a new message in the session is notified with a second notification strategy; displaying information of each session corresponding to a currently selected session screening identification in a second display area of a second message page achieves screening of the sessions according to the session screening identifications corresponding to different notification strategies. When a selection of a user shows that the user needs to browse a session corresponding to the session screening identification, with respect to the method of simultaneous display of all the session list, only the session matching the user request may be displayed according to the method of information displaying proposed in this embodiment, reducing the user's operation of searching for the required session in the all session list, and improving the interruption of unimportant sessions to the user due to message updates, and saving user's time for browsing the required session.

Please refer to FIG. 2, which shows the flowchart of some other embodiments of the method of information displaying provided in this embodiment. As shown in FIG. 2, the method of information displaying comprises the following steps.

Step 201, at least two session screening identifications are displayed in a first display area of a first message page, the at least two session screening identifications comprising: a first screening identification for indicating that a new message in a session is notified with a first notification strategy, and a second screening identification for indicating that a new message in the session is notified with a second notification strategy.

Step 202, information of each session corresponding to a currently selected session screening identification is displayed in a second display area of a second message page.

The above steps 201 to 202 may refer to the description of the relevant parts of the embodiment shown in FIG. 1. They will not be repeated this time.

Step 203, a change operation performed on at least one target session by a user is received, the change operation being for changing a screening identification corresponding to a target session, and the screening identification corresponding to the at least one target session is changed to a first target screening identification indicated by the change operation.

In this embodiment, users may also adjust the screening identification corresponding to the target session. For example, the screening identification corresponding to the target session is changed from a first screening identification to a second screening identification, or the screening identification corresponding to the target session is changed from the second screening identification to the first screening identification.

The changing operation comprises: an operation of changing the screening identification of the target session from an original screening identification to another screening identification; or, an operation of changing an attribute value of a notification attribute for the target session.

By the above operation of directly changing the screening identification of the target session from the original screening identification to another screening identification, the screening identification of the target session may be changed.

As an implementation, the target session may be a session displayed in the session list of the second display area. When users perform a preset operation on the target session (e.g., right-clicking an identification of the target session or long-pressing the target session), a screening identification change selection for changing the screening identification may be displayed. The screening identifications available for being changed to may be further displayed through the screening identification change selection. Users may select the first target screening identification from the screening identifications available for being changed to.

Further optionally, the above-described operation of changing the screening identification of the target session from the original screening identification to other screening identification operation comprises moving an identification of the target session to a location where the first target screening identification is located.

The identification of the target session may be displayed in the session list in the second display area. In these optional implementations, users may move the identification of the target session to the location where the first target screening identification is located, so that the screening identification of the target session is changed from the initial screening identification to the first target screening identification. By moving the identification of the target session, the screening identification of the session is changed. The operation of changing the session screening identification may be simplified.

The initial screening identification here may be a screening identification that is different from the first target screening identification. The initial screening identification may be any one of a first screening identification, a second screening identification, or other screening identifications. The first target screening identification may be any one of the first screening identification, the second screening identification, or other screening identifications.

Further, the attribute value of the notification attribute of the target session may also be changed, thereby achieving a change in the screening identification corresponding to the target session.

The preset operation may be performed on the target session displayed in the session list in the second display area, for example, right-clicking at the identification of the target session or long-pressing the target session to display notification attribute selections. The attribute value of the notification attribute is changed by the notification attribute selections.

The notification attribute of the session may comprise a first attribute value and a second attribute value. The first attribute value is used to indicate a real-time notification of new messages. The second attribute value is used to indicate that no real-time notification of new messages will be performed.

By changing the attribute value of the notification attribute of the session, the screening identification corresponding to the session may be adjusted, thereby realizing the association adjustment between the notification attribute and the session screening identification. In this way, users only need to adjust the notification attribute of the session according to existing habits. Through the association adjustment, automatic changes to the session screening identification may be realized, which simplifies user operations and improves operation efficiency.

In some optional implementations, the method of information displaying further comprises: if at least one second target session satisfies a preset screening identification change condition, presenting screening identification replacement prompt information, the screening identification replacement prompt information being for prompting changing of the screening identification corresponding to the at least one second target session.

In these optional implementations, the screening identification replacement prompt information may be present to a user automatically, to prompt the user to change the screening identification of at least one second target session.

In these optional implementations, by providing prompt information to a user in a timely manner to prompt the user to change the screening identification, it helps to reduce a switching operation of the screening identification caused by a user's need to browse the second target session.

Further, in the above-mentioned screening identification replacement prompt information, a multi-session screening identification change selection may be provided, and the multi-session screening identification change selection may realize changes of screening identifications of multiple second target sessions with one click. Users may perform a confirmation operation on the above-mentioned multi-session screening identification change selection, thereby changing the screening identifications of multiple second target sessions from the initial screening identification to the first target screening identification indicated by the multi-session screening identification change selection. Compared with a user searching for the second target sessions that meet the condition in multiple sessions one by one to change the screening identification, the user's operation can be reduced, and user's time can be saved.

In some application scenarios, the initial identification of at least one target session is the first screening identification, and the preset screening identification change condition comprises one of the following: a time interval for a user to browse the information of the session being greater than a preset time interval; and a number of times a user browses the information of the session within a preset time period being less than a preset threshold for the number of times. In these application scenarios, the screening identification replacement prompt information is used to prompt to change the screening identification corresponding to the at least one second target session from the first screening identification to the second screening identification. The interference caused by the information of the second target session may be reduced.

The notification frequency of the first notification strategy is higher than that of the second notification strategy. For example, the first notification strategy is that all messages of the session are notified in real time, and the second notification strategy is that all messages of the session are not notified in real time. Multiple sessions are grouped according to different notification strategies. The preset time interval may comprise 5 days, 10 days, etc. The preset time interval may be set according to specific application scenarios, and there is no restriction this time.

The above preset time period may be, for example, 5 days, 10 days, etc. The above a preset threshold for the number of times may be, for example, 1 time, 2 times, etc. The above a preset threshold for the number of times may be set according to specific application scenarios and is not set here.

That is, if a session with a low browsing frequency by a user corresponds to the first screening identification, the user may be prompted to change the session screening identification of the session to the second screening identification.

In some other application scenarios, the initial identification of at least one target session is the second screening identification, and the preset screening identification change condition comprises at least one of the following two screening conditions: the time interval for a user to browse the information of the session being less than the preset time interval; the number of times a user browses the information of the session within the preset time period being greater than the preset threshold for the number of times. The time interval for a user to browse the information of the session may be the time interval for the user to browse the information of the session the last two times, or an average time interval for browsing the information of the session several times recently, etc.

In these application scenarios, the screening identification replacement prompt information is used to prompt changing of the screening identification corresponding to the at least one second target session from the second screening identification to the first screening identification. It is convenient for users to timely understand the session information of the second target session.

As described above, the session associated with the second screening identification may not be notified in real time. If users need to frequently communicate with a contact of a session associated with the second screening identification, but the session is associated with the second screening identification, the new message of the session will not be notified in real time. The user needs to manually switch to the message corresponding to the second screening identification through a display switching operation, and then process the message of the session, causing poor user experience. The above screening identification replacement prompt information may be displayed to the user based on the user's recent browsing times.

A user may replace the screening identification of the second target session from the second screening identification to the first screening identification according to the screening identification replacement prompt information, thereby realizing real-time notification of the new message of the second target session, which is convenient for the user to process the new message of the second target session. In some optional implementations, the initial screening identification of the third target session is the first screening identification, and the preset screening identification change condition comprises a first preset condition. When the third target session satisfies the first preset condition, the screening identification of the third target session is changed to the second screening identification. Here, the third target session may be any session in multiple sessions.

In these optional implementations, when the third target session satisfies the first preset condition, the screening identification of the third target session may be automatically switched from the first screening identification to the second screening identification.

The first preset condition comprises one of the following: a time interval for a user to browse the information of the session being greater than a preset time interval; a number of times a user browses the information of the session within a preset time period being less than a preset threshold for the number of times. By changing the screening identification of the third target session that satisfies the first preset condition, the session with a lower user browsing frequency is made be associated with the second screening identification, which may reduce the frequency of user interference caused by real-time notification of new messages received for the session.

In still other optional implementations, the initial screening identification of the third target session is the second screening identification, the preset screening identification change condition comprises a second preset condition, when the third target session satisfies the second preset condition, the third target session screening identification is changed to the first screening identification.

In these optional implementations, when the third target session satisfies the second preset condition, the screening identification of the third target session may be automatically switched from the second screening identification to the first screening identification.

The second preset condition comprises at least one of the following two screening conditions: the time interval for a user to browse the information of the session is less than the preset time interval; the number of times a user browses the information of the session within the preset time period is greater than the preset threshold for the number of times.

By changing the screening identification of the third target session that satisfies the second preset condition, the session with a high user browsing frequency and originally associated with the second screening identification is changed to be associated with the first screening identification, thereby reducing operations of constantly switching between screening identifications due to the need for a user's frequently browsing messages in this session.

In these optional implementations, by automatically changing the session screening identification of the third target session when the session satisfies the preset screening identification change condition, operations of a user manual changing screening identification of the third target session are saved, thereby improving user experience.

Compared with embodiments shown in FIG. 1, the present embodiment highlights steps of changing the screening identification of the session, to achieve the purpose of changing the screening identification of the session according to the user's usage, further, since the screening identification of the session is timely change, the proportion of important information of the new message is notified to the user in real time is large, so that the reach rate of important messages is improved.

Please further refer to FIG. 3, which shows the flowchart of some other embodiments of the method of information displaying provided in this embodiment. As shown in FIG. 3, the method of information displaying comprises the following steps.

Step 301, at least two session screening identifications are displayed in a first display area of a first message page, the at least two session screening identifications comprises: a first screening identification for indicating that a new message in a session is notified with a first notification strategy, and a second screening identification for indicating that a new message in the session is notified with a second notification strategy.

Step 302, information of each session corresponding to a currently selected session screening identification is displayed in a second display area of a second message page.

The above steps 301 to 102 may refer to the description of the relevant parts of embodiments as shown in FIG. 1. They will not be repeated this time.

Step 303, in response to receiving a new message of a session corresponding to the second screening identification, whether the new message satisfies preset conditions is determined.

Step 304, in response to determining that the new message satisfies the preset condition, the information of the session is displayed in the second display area, wherein a currently selected session list corresponding to the first screening identification is displayed in the second display area.

In this embodiment, a session list corresponding to the first screening identification is displayed in the second display area. For example, information of each session for real-time notification of new messages is displayed in the second display area. In a case where the session list corresponding to the first screening identification is displayed in the second display area, a received new message of a session corresponding to the second screening identification satisfies the preset condition, and then the information of the session may be displayed in the second display area. That is, the information of the session that meets the preset condition and originally should not be displayed in the second display area is displayed in the second display area in a timely manner to notify the user in a timely manner that the session has received a new message.

As an implementation, the method of information displaying comprises: in response to determining that the new message satisfies the preset condition, the session is associated with both of the first session screening identification and second session screening identification.

With this implementation, the session satisfying the preset condition is associated with both of the first screening identification and the second screening identification, so that the information of the session is displayed in the second display area displaying the first session screening identification. Thus, in terms of information displaying, the information of the session corresponding to the message satisfying preset condition is displayed to the user in time for users to browse.

The above preset conditions comprise at least one of the following.

The new message has a predetermined character;
The sender of the new message is a designated contact;
The new message contains a designated keyword.

The predetermined character comprises one or more of the following: a character for indicating directional transmission, a character for indicating expedited processing.

The character of a directional transmission here may be any character indicating that the message is sent to a designated user, such as "@". The directional transmission may be a directional transmission to a certain user or a directional transmission to all users of the group session.

The designated contact may be, for example, a contact designated by the user in advance. The designated contact may be a contact in a group session.

The above designated keyword may be any pre-set keyword.

In some optional implementations, the information of the session displayed in the second display area comprises at least one of the following: information for indicating a second screening identification, information of the preset condition as satisfied, a transmitting time or a receiving time of the new message. In addition, the information of the session displayed in the second display area may further comprise: an identification of the session where the new message is in, summary information of the new message, etc.

The information for indicating the second screening identification may comprise text information, graphic information or image information.

The session information displayed in the second display area comprises information indicating a second screening identification, which is convenient for a user to know which session group corresponding to the screening identification the session is transparently transmitted from.

In some application scenarios, the above preset conditions may comprise, for example: a new message has a predetermined character. The information of the session displayed in the second display area may comprise the above-mentioned predetermined character. The above-mentioned predetermined character may comprise, for example, the directional transmission character (such as "@") and a character for indicating that the message is an urgent message.

In some application scenarios, the above preset conditions may comprise, for example: a sender of the new message is a designated contact. The information of the session displayed in the second display area may comprise an identification of the designated contact.

Information of the session displayed in the second display area comprises information of the preset condition as satisfied, which is convenient for a user to know that the session is transparently transmitted because it meets what condition.

Time information of the session displayed in the second display area may not be the time information of the latest message received by the session. The time information of the session displayed in the second display area may be the time information of sending or receiving a message satisfying the preset condition. Since the session is transparently transmitted to the second display area because a message satisfying the preset condition is received, the time information also displays the time of receiving or sending the message satisfying the preset condition, so that users may more intuitively obtain the relevant time of this important message satisfying the preset condition.

Further, if no further new message is detected to satisfy the preset condition in the subsequent reception of the session, the session information displayed in the second display area remains unchanged.

In these optional implementations, it is convenient for a user to understand the occurrence time of the message of the session satisfying the preset condition in the second display area, so that the user may process the new message of the session satisfying the preset condition accordingly. In addition, the preset condition included in the information of the session may help the user understand the key information of the new message satisfying the preset condition, and assist the user in judging the importance of the new message satisfying the preset condition.

In some optional implementations, the method of information displaying further comprises: in accordance with a determination that a preset operation performed by a user on the information of the session displayed in the second display area, presenting at least one message of the session comprising the new message which satisfies the preset condition is present.

In these optional implementations, at least one message of the session may be displayed in the second display area, and the at least one message comprises the new message satisfying the preset condition. In this way, without switching the screening identification by a user, the information of the session can be displayed in the second display area that originally displays the session list of the first screening identification. The switching operation of a user is reduced.

In some optional implementations, the method of information displaying further comprises: when information of the session satisfies a preset cancellation condition, the display of the information of the session in the second display area is canceled.

That is, the information of the session satisfies the preset cancellation condition, the information of the session may not continue to be display in the second display area.

The above preset cancellation conditions comprise one of the following.

A user reads the new message.

A duration after a user reads the new message is longer than a preset duration.

A user performs a screening identification switching operation after reading the new message;

A user makes a current page not display the session through a page operation after reading the new message.

In some application scenarios, the above preset cancellation condition is that a user reads the new message. When it is detected that a user has read the new message, display of the information of the session may be canceled in the second display area. By canceling the display of the information of the session in time, the interference of the information of the session on the information of the session of the currently selected screening identification may be avoided.

In some other application scenarios, the above preset cancellation condition is that a duration after a user reads the new message is longer than a preset duration. When the duration after a user reads the new message is longer than the preset duration, display of the information of the session may be canceled in the second display area. The preset duration may be 3 minutes, 5 minutes, 2 hours, etc. That is to say, after detecting the user's reading operation (such as opening operation for the new message) for a period of time, the display of the information of the session corresponding to the new message may be canceled. By extending the display time for a user to read the new message, the problem of a user not really reading the new message due to missoperation may be avoided.

In other application scenarios, the above preset cancellation condition is that a user performs a screening identification switching operation after reading the new message. That is, after a user reads the new message and performs the screening identification switching operation, the display of the information of the session may be canceled in the second display area.

In some other application scenarios, the above preset cancellation condition is that a user makes a current page not display the session through a page operation after reading the new message. The page operation such as: a user scrolling the session feed stream, or opening other pages such as calendars, cloud documents, and mailboxes in the instant messaging application, or closing the instant messaging application. That is, after a user reads the new message, the user causes the information of the session to be no longer displayed in the current page through the above page operation, and the display of the information of the session may be canceled in the second display area.

In the above two application scenarios, a user reads the new message, and performs a page operation to achieve information switching, means that the user has browsed the new message, and will process other information next, thus the display of the information of the session information may be canceled in the second display area.

As an implementation, after the information of session displayed in the second display area satisfies a preset cancellation condition, the association of the session with the currently selected first screening identification is canceled.

By releasing the association between the session satisfying the preset cancellation condition and the first screening identification, the session is only associated with the second screening identification, so that the information of the session does not continue to be displayed in the second display area. Interference to information of the session corresponding to the first screening identification caused by the information of the session satisfying the preset cancellation condition displayed in the second display area may be reduced. The second display area may continue to display information of the session corresponding to the first screening identification.

Compared with embodiments as shown in FIG. 1, the method of information displaying provided in the present embodiment highlights the session corresponding to the second screening identification, after receiving a new message satisfying a preset condition, the information of the session may be displayed in the second display area displaying the session list corresponding to the first screening identification, so that a user may keep abreast of the received new message of the session, to avoid the problem of being unable to process important messages in the session associated with the second screening identification in a timely manner due to the user associating the session with the second screening identification.

In some optional implementations of the method of information displaying provided in FIGS. 1, 2, and 3 of the present disclosure, the above-mentioned method of information displaying further comprises the following steps.

First, the target message is determined based on a received search request.

Secondly, whether a second target screening identification corresponding to the session comprising the target message is a currently selected screening identification is determined.

Again, if result of the determining is negative, the second display area is switched to display information of the session corresponding to the second target screening identification.

When a user performs a search, it means that the user needs to know the message that matches the search and the messages before and after the message. When the second target screening identification corresponding to the target message is not the currently selected screening identification, the currently selected screening identification may be automatically switched to the second target screening identification. In this way, it is convenient for the user to browse the message of the session corresponding to the message under the second target screening identification.

Further, the method of information displaying further comprises: the session comprising the target message is highlighted in the second display area.

In these optional implementations, a user may enter a search term in a message page (where the message page here may be the first message page or the second message page) to retrieve a target message that matches the search term. The target message that matches the search term may be associated with the first screening identification or with the second screening identification.

When the target message is associated with the first screening identification, the session to which the target message belongs may be highlighted in the second display area displaying information of the session corresponding to the first screening identification.

When the target message is associated with the second screening identification, the content displayed in the second display area may be automatically switched to the information of the session associated with the second screening identification, and the information of the session to which the target message belongs is highlighted.

When a user enters a search term, its purpose is to find the target message. With these optional implementations, the information of the session corresponding to the target message matching the search term is highlighted in the first display area, which helps the user to quickly browse to the target message.

In some optional implementations, the session comprising the target message being highlighted in the second display area comprises at least one of the following.

The session comprising the target message is pined to top.

The session comprising the target message is displayed in a setting mode.

The session comprising the target message is selected by default.

Displaying the session comprising the target message in the above setting mode comprises adding a border to the session comprising the target message, highlighting the session comprising the target message, or using a special font to display the target message, etc.

The above setting mode is used to display the session comprising the target message, so that users may easily discover the session comprising the target message.

Taking the session comprising the target message as the selected session further speeds up the user's ability to find the session comprising the target message.

Figure 4A:
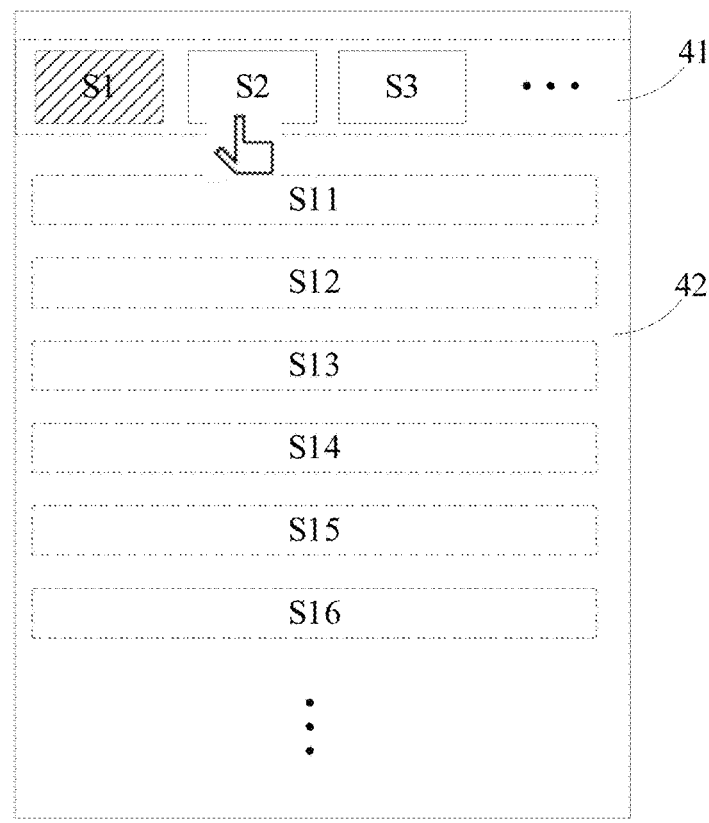
FIGS. 4A to 4C are schematic diagrams of some application scenarios of the method of information displaying of the present disclosure.
Figure 4B:
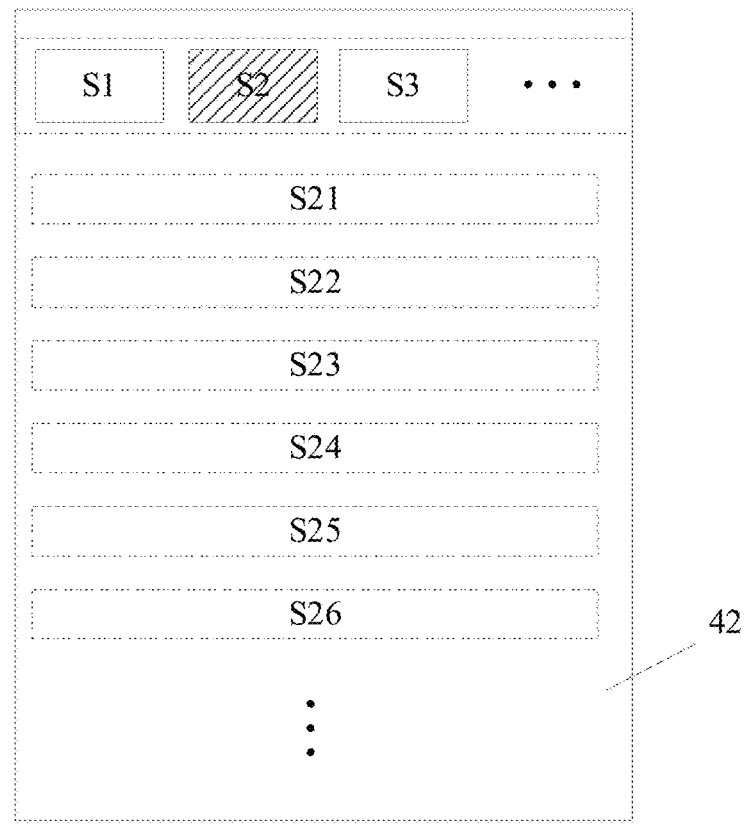
Figure 4C:
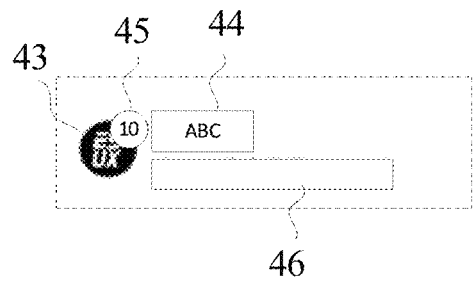

FIGS. 4A to 4C shows schematic diagrams of some application scenarios of a method of information displaying provided in the present disclosure.

As shown in FIG. 4A, the first message page and the second message page are the same page. The first message page comprises a first display area 41 and a second display area 42. Information of the session corresponding to the first screening identification is displayed in the second display area 42, and the screening identification is displayed in the first display area 41. The message display page here may be the message display page of the preset instant messaging application or the message display page of other web pages. FIG. 4A shows a part or all of the message display page.

The first display area 41 displays a first screening identification S1, a second screening identification S2 and other screening identification S3.

In some optional implementations, the screening identification associated with the message of the session may be determined according to an attribute value of a notification attribute of the session. Here, the screening identification associated with the message of the session determined based on the attribute value of the notification attribute comprises the first screening identification S1 and the second screening identification S2. Messages corresponding to other screening identifications may be screened based on other screening condition.

Optionally, the second display area 42 displays information of multiple sessions associated with the first screening identification S1 by default. As shown in FIG. 4A, when a user opens the message display page, the information S11, S12, S13, S14, S15, and S16 of the session associated with the first screening identification are displayed in the second display area S42 of the message display page. As shown in FIG. 4C, the information of each session may comprise an identification of the session. The identification of the session comprises a graphic identification 43 and a text identification 44. The identification of the session is used to distinguish different sessions. In some application scenarios, the identification of the session comprises a user identification of a contact. For example, the text identification 44 "ABC" as shown in FIG. 4C is the user identification of the contact. The information of the session may also comprise brief information about a recently received message. The brief information may be displayed at a preset position 46.

A user may perform a triggering operation on the screening identification to display information of sessions corresponding to different screening identifications in the second display area 42. As shown in FIG. 4A, a user may perform a triggering operation on the second screening identification S2. According to the triggering operation performed by the user on the second screening identification S2, the content displayed in the second display area 42 may be switched to information S21, S22, S23, S23, S24, S25, S26 of multiple sessions corresponding to the second screening identification, as shown in FIG. 4B.

In addition, the information of the session also comprises the number of unread messages 45, as shown in FIG. 4C, and the number of unread messages of a session is 10.

When a new message is received, if the screening identification corresponding to the session to which the new message belongs is the first screening identification, the displayed information of the session is updated in the first display area. For example, the session corresponding to the new message is displayed at the top of the first display area. The number of unread messages corresponding to the new message is updated, etc.

Figure 5:
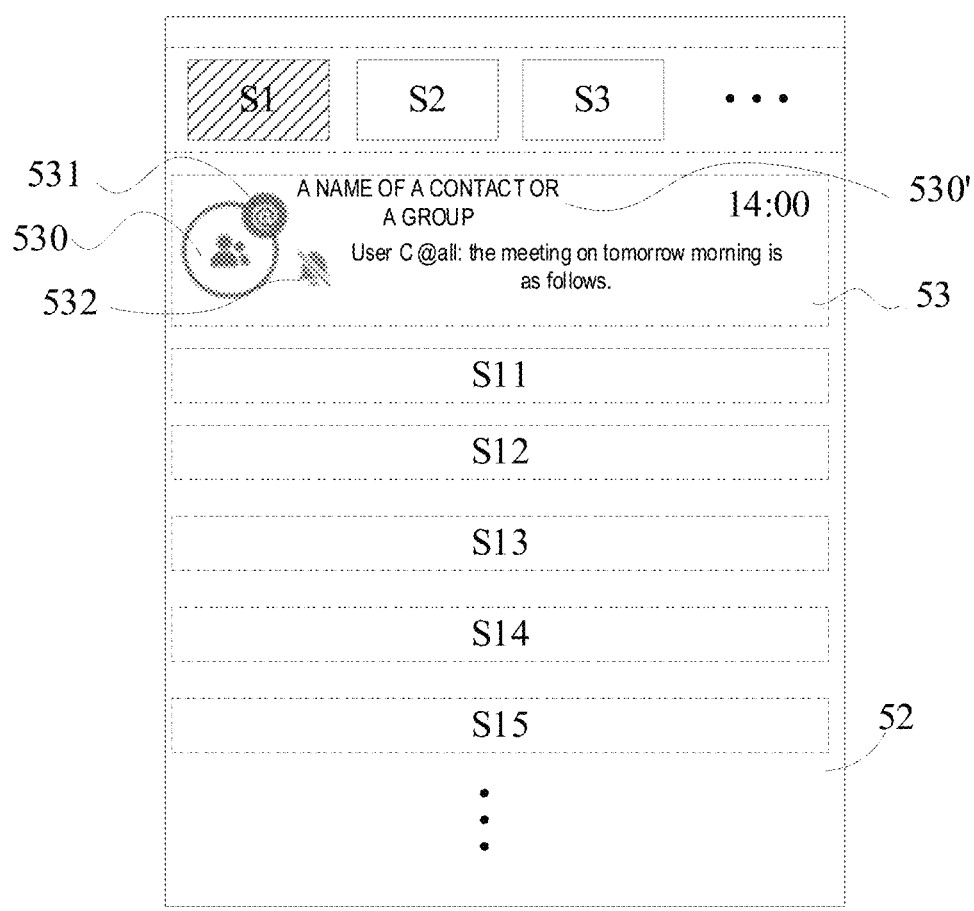
FIG. 5 is a schematic diagram of some other application scenarios of the method of information displaying of the present disclosure.

Please continue to refer to FIG. 5, which shows a schematic diagram of a further application scenario of the method of information displaying provided by the present disclosure.

As shown in FIG. 5, the first message page and the second message page are the same page. The second display area 52 of the message page displays the session lists S11, S12, S13, S14, and S15 corresponding to the first screening identification S1. At this time, if a new message of a session is received, the session to which the new message belongs is associated with the second screening identification S2. If the new message does not satisfy the preset display conditions, there is no prompt of receiving the new message. If the new message satisfies the preset conditions, the session to which the new message belongs may be associated with the first screening identification S1 and the second screening identification S2 at the same time.

For example, as shown in FIG. 5, the first screening identification S1 is currently selected, the session list of S1 is displayed in the second display area. At this time, if a session belonging to the second screening identification S2 receives a new message that satisfies the preset condition, the information 53 of the session to which the new message belongs is displayed in the second display area 52. The information 53 of the session to which the new message belongs may comprise an identification of the session to which the new message belongs. The identification of the above-mentioned session comprises the name 530' of the contact or group of the session, and the graphic or image identification 530 of the session. Information for indicating the preset condition satisfied by the new message, for example, the preset condition may be any one of the following: the new message comprises a predetermined character, the user sending the new message is a designated contact, and the new message comprises a designated keyword. As shown in FIG. 5, the information 53 of the session to which the new message belongs comprises a predetermined character "@" 531 used to indicate a directional transmission of the new message, such as the message "@" everyone or "@" me. In addition, the information 53 of the session to which the new message belongs comprises information for indicating that the screening identification corresponding to the session is the second screening identification S2. As shown in FIG. 5, the graphic information 532 for identifying the second screening identification is used. The graphic information 532 may comprise, for example, a graphic that indicate no real-time notification of the received new message will be provided, for example, it may specifically be a bell with a diagonal line as shown in FIG. 5. That is, in FIG. 5, the bell with a diagonal line is used to indicate the second screening identification S2.

In addition, the information 53 of the session to which the new message belongs comprises summary information of the new message: User C @all: the content of the meeting on tomorrow morning is as follows. The information 53 of the session to which the new message belongs also comprises time information 14:00 of sending or receiving the new message. Here, the sending time of the new message comprises: the time when the user inputs the character "@", or the time when the sending user clicks a send message control. It should be noted that if the session to which the new message belongs does not receive a new message that satisfies the preset condition, the information of the session displayed in the second display area remains the information as shown in FIG. 5 unchanged.

Figure 6:
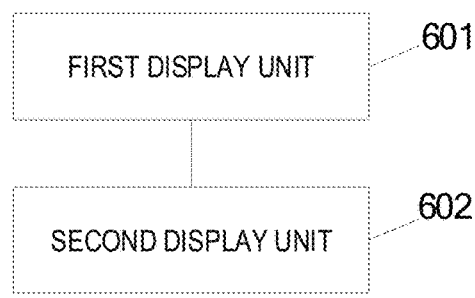
FIG. 6 is a schematic diagram of the structure of an information display device according to an embodiment of the present disclosure.

Further referring to FIG. 6, as an implementation of the methods as shown in the above Figures, the present disclosure provides an embodiment of an information display device, which corresponds to method embodiments as shown in FIG. 1, and may be specifically applied to various electronic devices.

As shown in FIG. 6, the information display device of the present embodiment comprises: a first display unit 601 and a second display unit 602. Herein the first display unit 601 is for displaying at least two session screening identifications in a first display area of a first message page, the at least two session screening identifications comprising: a first screening identification indicating that a new message in a session is notified with a first notification strategy, and a second screening identification indicating that a new message in the session is notified with a second notification strategy; the second display unit 602 is for displaying information of each session corresponding to a currently selected session screening identification in a second display area of a second message page.

In this embodiment, the specific processing of the first display unit 601 and the second display unit 602 of the information display device and the technical effects they bring may be referred to the relevant descriptions of steps 101 and 102 in embodiments corresponding to FIG. 1, respectively, and will not be repeated here.

In some optional implementations, the information display apparatus further comprises a screening identification change unit (not shown). The screening identification change unit is configured to: receive a change operation performed on at least one target session by a user, the change operation being for changing a screening identification corresponding to a target session, and change the screening identification corresponding to the at least one target session to a first target screening identification indicated by the change operation.

In some optional implementations, the change operation comprises: an operation of changing the screening identification of the target session from an original screening identification to another screening identification; or an operation of changing an attribute value of a notification attribute for the target session.

In some optional implementations, the operation of changing the screening identification of the target session from the original screening identification to another screening identification comprises: moving an identification of the target session to a location where the first target screening identification is located.

In some optional implementations, the change unit is further configured to: if at least one second target session satisfies a preset screening identification change condition, present screening identification replacement prompt information, the screening identification replacement prompt information being for prompting changing of the screening identification corresponding to the at least one second target session.

In some optional implementations, the preset screening identification change condition comprises at least one of following two screening conditions: a time interval for a user to browse the information of the session being greater than a preset time interval; a number of times a user browses the information of the session within a preset time period being less than a preset threshold for the number of times; the screening identification replacement prompt information is for prompting changing of the screening identification corresponding to the at least one second target session from the first screening identification to the second screening identification; or the preset screening identification change condition comprises at least one of following two screening conditions: the time interval for a user to browse the information of the session is less than the preset time interval; the number of times a user browses the information of the session within the preset time period is greater than the preset threshold for the number of times; the screening identification replacement prompt information is for prompting changing of the screening identification corresponding to the at least one second target session from the second screening identification to the first screening identification; wherein a notification frequency of the first notification strategy is higher than a notification frequency of the second notification strategy.

In some optional implementations, a notification frequency of the first notification strategy is higher than a notification frequency of the second notification strategy.

In some optional implementations, the first notification strategy is that all messages of the session are notified in real time, and the second notification strategy is that all messages of the session are not notified in real time, or the first notification strategy is that all messages of the session are notified in real time, and the second notification strategy is that messages of the session meet a preset condition are notified in real time, and other messages that do not meet the preset condition are not notified in real time.

In some optional implementations, an initial selected identification of a third target session is the first screening identification, the preset screening identification change condition comprises a first preset condition, and when the third target session satisfies the first preset condition, the screening identification of the third target session is changed to the second screening identification, or the initial selected identification of the third target session is the second screening identification, the preset screening identification change condition comprises a second preset condition, when the third target session satisfies the second preset condition, the screening identification of the third target session is changed to the first screening identification.

In some optional implementations, the second display unit 602 is further configured to: if no selection operation of a user on the session screening identifications is detected, determine the first screening identification as the currently selected session screening identification by default.

In some optional implementations, the second display unit 602 is further for: in response to receiving a new message of a session corresponding to the second screening identification, determining whether the new message satisfies a preset condition; and in response to determining that the new message satisfies the preset condition, displaying the information of the session in the second display area, wherein a session list corresponding to the currently selected first screening identification is displayed in the second display area.

In some optional implementations, the preset condition comprises at least one of the following: the new message has a predetermined character; a sender of the new message is a designated contact; the new message contains a designated keyword.

In some optional implementations, the predetermined character comprises: a character for indicating a directional transmission and/or a character for indicating expedited processing.

In some optional implementations, the information of the session displayed in the second display area comprises at least one of: information for indicating the second screening identification, information of the preset condition satisfied, a transmitting time or a receiving time of the new message.

In some optional implementations, the second display unit 602 is further for: if a further new message of the session unsatisfying the preset condition is received, keeping the information of the session displayed in the second display area unchanged; or if a further new message of the session satisfying the preset condition is received, updating the session displayed in the second display area information according to the further new message of the session satisfying the preset condition. In some optional implementations, the second display unit 602 is further for presenting at least one message of the session comprising the new message, in accordance with a determination that a preset operation performed by the user on the information of the session displayed in the second display area.

In some optional implementations, the information display device further comprises an association unit (not shown). The association unit is for: in response to determining that the new message satisfies the preset condition, associating the session with both of a first session screening identification and a second session screening identification.

In some optional implementations, the second display unit 602 is further for: canceling display of the information of the session in the second display area after the information of the session satisfies a preset cancellation condition.

In some optional implementations, the preset cancellation condition comprises one of: a user reading the new message; a duration after a user reads the new message being longer than a preset duration; a user performing a screening identification switching operation after reading the new message; a user disabling display of the session on a current page through a page operation after reading the new message.

In some optional implementations, the association unit is further for: canceling association of the session with the currently selected first screening identification after the information of the session displayed in the second display area satisfies a preset cancellation condition.

In some optional implementations, the second display unit is further for: determining a target message based on a received search request; determining whether a second target screening identification corresponding to the session comprising the target message is a currently selected screening identification; if a result of the determining is negative, switching the second display area to display information of the session corresponding to the second target screening identification.

In some optional implementations, the second display unit 602 is further for: highlighting the session comprising the target message in the second display area.

In some optional implementations, the highlighting the session comprising the target message in the second display area comprises at least one of pining the session comprising the target message is located to top; displaying the session comprising the target message in a setting mode; selecting, by default, the session comprising the target message.

In some optional implementations, the session screening identification is determined based on the following steps: obtaining at least one session; determining a notification strategy corresponding to each session based on an attribute value of a notification attribute of the at least one session, wherein the notification strategy comprises a first notification strategy and a second notification strategy; determining the session screening identification corresponding to each session according to the notification strategy corresponding to each session, and associating each session with the corresponding session screening identification; wherein the session screening identification comprises a first session screening identification and a second session screening identification.

Figure 7:
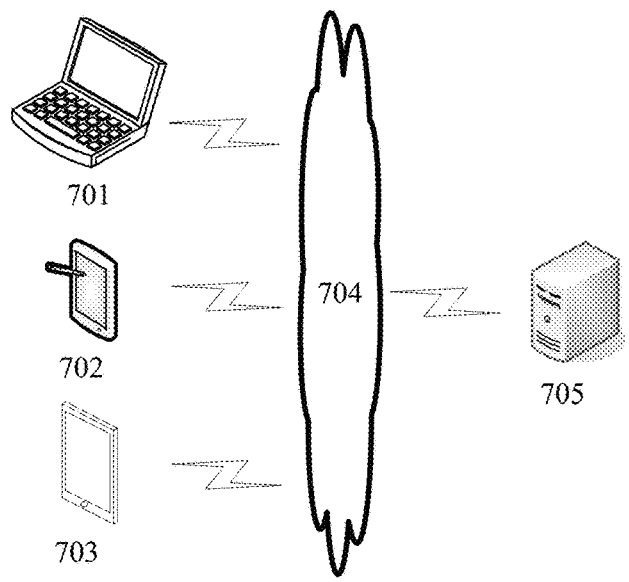
FIG. 7 is an exemplary system architecture to which a method of information displaying according to an embodiment of the present disclosure may be applied.

Please refer to FIG. 7 which shows an exemplary system architecture to which a method of information displaying of one embodiment of the present disclosure may be applied.

As shown in FIG. 7, the system architecture may include terminal devices 701, 702, 703, network 704, and a server 705. Network 704 is a medium used to provide communication links between terminal devices 701, 702, 703, and a server 705. Network 704 can include various connection types, such as wired, wireless communication links, or fiber optic cables.

Terminal devices 701, 702, and 703 can interact with server 705 through network 704 to receive or send messages, etc. Various client applications can be installed on terminal devices 701, 702, and 703, such as web browser applications, search applications, and news and information applications. The client applications in terminal devices 701, 702, and 703 can receive user instructions and complete corresponding functions according to the user's instructions, such as adding corresponding information to the information according to the user's instructions.

Terminal devices 701, 702, and 703 can be hardware or software. When terminal devices 701, 702, and 703 are hardware, they can be various electronic devices with display screens and support web browsing, including but not limited to smartphones, tablets, e-book readers, MP3 players (Moving Picture Experts Group Audio Layer III), MP4 players (Moving Picture Experts Group Audio Layer IV), laptops and desktop computers, and more. When terminal devices 701, 702, and 703 are software, they can be installed in the electronic devices listed above. It can be implemented as multiple software or software modules (such as software or software modules used to provide distributed services), or as a single software or software module, which is not limited here.

Server 705 can be a server that provides various services, such as receiving information sent by terminal devices 701, 702, and 703, and forwarding the above information to other terminals.

It is to be noted that the presentation method provided in the present embodiment may be executed by the terminal equipment, and accordingly the presentation apparatus may be arranged in the terminal equipment 701, 702, 703. In addition, the presentation method provided by the present disclosure embodiment may also be executed by the server 705, and accordingly, the presentation apparatus may be arranged in the server 705.

It is to be understood that the number of terminal devices, networks, and servers shown in FIG. 7 is only for the propose of illustration. Depending on the implementation, any number of terminals, networks, and servers may be included.

Figure 8:
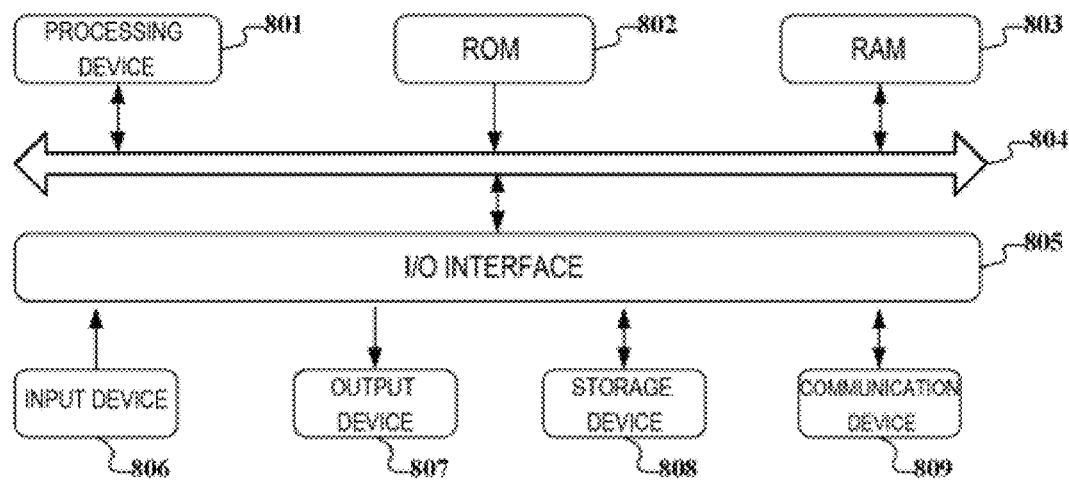
FIG. 8 is a schematic diagram of the basic structure of an electronic device provided according to embodiments of the present disclosure.

Reference is now made to FIG. 8, illustrates a schematic diagram of the basic structure of an electronic device (the terminal device or server shown in FIG. 7) proposed according to embodiments of the present disclosure. The terminal devices in embodiments of the present disclosure may include, but are not limited to, mobile terminals such as mobile phones, laptops, digital broadcasting receivers, personal digital assistants (PDAs), portable android devices (PADs), portable multimedia players (PMPs), terminals on broad (such as navigation terminals on broad), and fixed terminals such as digital TVs, desktop computers, and the like. The electronic device shown in FIG. 8 is only for the propose of illustration and should not suggest any limitations on the functionality and scope of use of the disclosed embodiment.

As shown in FIG. 8, the electronic device may include a processing device (e.g., a central processing unit, a graphics processor, etc.) 801 that can perform various appropriate actions and processes based on programs stored in read-only memory (ROM) 802 or loaded from the storage device 808 into random access memory (RAM) 803. In RAM 803, various programs and data required for the operation of the electronic device 800 are also stored. The processing unit 801, ROM 802, and RAM 803 are connected to each other via bus 804. The input/output (I/O) interface 805 is also connected to bus 804.

In general, the following devices can be connected to the I/O interface 805: an input device 806 including, for example, touch screen, touchpad, keyboard, mouse, camera, microphone, accelerometer, gyroscope, etc.; an output device 807 such as liquid crystal display (LCD), speakers, vibrators, etc.; a storage device 808 such as magnetic tape, hard disk, etc.; and a communication device 809. The communication device 809 may allow electronic devices to communicate wirelessly or wired with other devices to exchange data. Although FIG. 8 shows an electronic device with a variety of devices, it is to be understood that it is not required to implement or deploy all of the devices shown. More or fewer apparatuses may be implemented or possessed instead.

Specifically, according to the disclosed embodiments, the process described above with reference to the flowchart can be implemented as a computer software program. For example, the disclosed embodiment includes a computer program product that includes a computer program carried on a non-transient computer-readable medium, which includes program code for executing the method shown in the flowchart. In such embodiments, the computer program can be downloaded and installed from the network through communication device 809, or installed from storage device 808, or installed from ROM 802. When the computer program is executed by the processing device 801, the above-mentioned functions defined in the method of the present disclosed embodiment are executed.

It is to be noted that the computer-readable medium mentioned in this disclosure can be a computer-readable signal medium, a computer-readable storage medium, or any combination of the two. Computer readable storage media can be, for example, but not limited to, systems, devices or devices of electricity, magnetism, light, electromagnetism, infrared, or semiconductors, or any combination of the above. More specific examples of computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices Or any suitable combination of the above.

In this disclosure, a computer-readable storage medium may be any tangible medium that contains or stores a program, which can be used by or in combination with an instruction execution system, device, or device. In this disclosure, computer-readable signal media may include data signals propagated in the baseband or as part of the carrier wave, which carry computer-readable program code. This propagation of data signals can take various forms, including but not limited to electromagnetic signals, optical signals, or any suitable combination of the above. A computer-readable signal medium can also be any computer-readable medium other than a computer-readable storage medium, which can send, propagate, or transmit programs for use by or in combination with instruction execution systems, devices, or devices. The program code contained on computer readable media can be transmitted using any suitable medium, including but not limited to wires, optical cables, RF (radio frequency), etc., or any suitable combination of the above.

In some implementations, clients and servers can communicate using any currently known or future developed network protocol such as HTTP (HyperText Transfer Protocol) and can interconnect with any form or medium of digital data communication (such as communication networks). Examples of communication networks include local area networks ("LANs"), wide area networks ("WANs"), internets (such as the Internet), and end-to-end networks (such as ad hoc end-to-end networks), as well as any currently known or future developed networks.

The computer readable medium mentioned above can be included in the electronic device mentioned above; it can also exist separately without being assembled into the electronic device.

The computer readable medium carries one or more programs. When one or more programs are executed by the electronic device, cause the electronic device to display at least two session screening identifications in a first display area of a first message page, the at least two session screening identifications comprising: a first screening identification for indicating that a new message in a session is notified with a first notification strategy, and a second screening identification for indicating that a new message in the session is notified with a second notification strategy; and display information of each session corresponding to a currently selected session screening identification in a second display area of a second message page.

Computer program code for executing the operations disclosed herein may be written in one or more programming languages or combinations thereof, including but not limited to object-oriented programming languages such as Java, Smalltalk, C++, as well as conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In cases involving remote computers, the remote computer can be connected to the user's computer through any type of network, including a local area network (LAN) or wide area network (WAN), or can be connected to an external computer (such as using an Internet service provider to connect through the Internet).

The flowchart and block diagram in the attached figure illustrate the possible architecture, functions, and operations of systems, methods, and computer program products according to various embodiments of the present disclosure. At this point, each box in a flowchart or block diagram can represent a module, program segment, or part of code that contains one or more executable instructions for implementing specified logical functions. It should also be noted that in some alternative implementations, the functions indicated in the boxes can also occur in a different order than those indicated in the accompanying drawings. For example, two consecutive boxes can actually be executed in parallel, and sometimes they can also be executed in the opposite order, depending on the function involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The units described in the present disclosed embodiment can be implemented through software or hardware. Among them, the name of the unit does not constitute a qualification for the unit itself in a certain situation, for example, the first determination unit can also be described as "the unit that determines whether the as-is presentation condition is met".

The functions described above in this article can be at least partially executed by one or more hardware logic components. For example, non-limiting examples of hardware logic components that can be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

In the context of this disclosure, machine readable media can be tangible media that can contain or store programs for use by or in combination with instruction execution systems, devices, or devices. A machine readable media can be machine readable signal media or machine readable storage media. A machine readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The above description is only a preferred embodiment of this disclosure and an explanation of the technical principles used. Those skilled in the art should understand that the scope of disclosure involved in the present disclosure is not limited to technical solutions formed by specific combinations of the aforementioned technical features, but also covers other technical solutions formed by any combination of the aforementioned technical features or their equivalent features without departing from the disclosed concept. For example, a technical solution formed by replacing the above features with (but not limited to) technical features with similar functions disclosed in this disclosure.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of information displaying comprising:
    displaying at least two session screening identifications in a first display area of a first message page, the at least two session screening identifications comprising: a first screening identification for indicating that a new message in a session is notified with a first notification strategy, and a second screening identification for indicating that a new message in the session is notified with a second notification strategy, wherein the first notification strategy is that all messages of the session are notified in real time, and the second notification strategy is that messages of the session meet a preset condition are notified in real time, and other messages that do not meet the preset condition are not notified in real time, and wherein the preset condition comprises at least one of: the new message having a predetermined character; a sender of the new message being a designated contact; the new message containing a designated keyword; and
    displaying information of each session corresponding to a currently selected session screening identification in a second display area of a second message page.

2. The method of claim 1, wherein the method further comprises:
    receiving a change operation performed on at least one target session by a user, the change operation being for changing a screening identification corresponding to a target session, and
    changing a screening identification corresponding to the at least one target session to a first target screening identification indicated by the change operation.

3. The method of claim 2, wherein the change operation comprises:
    an operation of changing the screening identification of the target session from an original screening identification to another screening identification;
    or,
    an operation of changing an attribute value of a notification attribute for the target session.

4. The method of claim 3, wherein the operation of changing the screening identification of the target session from the original screening identification to another screening identification comprises:
    moving an identification of the target session to a location where the first target screening identification is located.

5. The method of claim 1, wherein the method further comprises:
    if at least one second target session satisfies a preset screening identification change condition, presenting screening identification replacement prompt information, the screening identification replacement prompt information being for prompting changing of the screening identification corresponding to the at least one second target session.

6. The method of claim 5, wherein
    the preset screening identification change condition comprises at least one of following two screening conditions: a time interval for a user to browse the information of the session being greater than a preset time interval; and a number of times a user browses the information of the session within a preset time period being less than a preset threshold for the number of times;
    the screening identification replacement prompt information is for prompting changing of the screening identification corresponding to the at least one second target session from the first screening identification to the second screening identification;
    or,
    the preset screening identification change condition comprises at least one of following two screening conditions: the time interval for a user to browse the information of the session being less than the preset time interval; the number of times a user browses the information of the session within the preset time period being greater than the preset threshold for the number of times;
    the screening identification replacement prompt information is for prompting changing of the screening identification corresponding to the at least one second target session from the second screening identification to the first screening identification;
    wherein a notification frequency of the first notification strategy is higher than a notification frequency of the second notification strategy.

7. The method of claim 1, wherein,
    a notification frequency of the first notification strategy is higher than a notification frequency of the second notification strategy.

8. The method of claim 7, wherein,
    the first notification strategy is that all messages of the session are notified in real time, and the second notification strategy is that all messages of the session are not notified in real time.

9. The method of claim 7, wherein,
    an initial screening identification of a third target session is the first screening identification, the preset screening identification change condition comprises a first preset condition, and if the third target session satisfies the first preset condition, the screening identification of the third target session is changed to the second screening identification;
    or,
    the initial screening identification of the third target session is the second screening identification, the preset screening identification change condition comprises a second preset condition, and if the third target session satisfies the second preset condition, the screening identification of the third target session is changed to the first screening identification.

10. The method of claim 1, wherein the displaying information of each session corresponding to the currently selected session screening identification in the second display area of the second message page comprises:
if no selection operation of a user on the session screening identifications is detected, determining the first screening identification as the currently selected session screening identification by default.

11. The method of claim 1, wherein the method further comprises:
in response to receiving a new message of a session corresponding to the second screening identification, determining whether the new message satisfies a preset condition;
in response to determining that the new message satisfies the preset condition, displaying the information of the session in the second display area, wherein a session list corresponding to the currently selected first screening identification is displayed in the second display area.

12. The method of claim 11, wherein the method further comprises at least one of the following:
if a further new message of the session unsatisfying the preset condition is received, keeping the information of the session displayed in the second display area unchanged; or
if a further new message of the session satisfying the preset condition is received, updating the session displayed in the second display area information according to the further new message of the session satisfying the preset condition.

13. The method of claim 11, wherein the method further comprises at least one of:
in accordance with a determination that a preset operation performed by the user on the information of the session displayed in the second display area, presenting at least one message of the session, the at least one message comprising the new message;
in response to determining that the new message satisfies the preset condition, associating the session with both of a first session screening identification and a second session screening identification; or
canceling association of the session with the currently selected first screening identification after the information of the session displayed in the second display area satisfies a preset cancellation condition.

14. The method of claim 11, wherein the method further comprises:
canceling display of the information of the session in the second display area after the information of the session satisfies a preset cancellation condition,
wherein the preset cancellation condition comprises one of:
a user reading the new message;
a duration after a user reads the new message being longer than a preset duration;
a user performing a screening identification switching operation after reading the new message;
a user disabling display of the session on a current page through a page operation after reading the new message.

15. The method of claim 1, wherein the method further comprises:
determining a target message based on a received search request;
determining whether a second target screening identification corresponding to the session comprising the target message is a currently selected screening identification;
if a result of the determining is negative, switching the second display area to display information of the session corresponding to the second target screening identification.

16. The method of claim 15, wherein the method further comprises:
highlighting, in the second display area, the session comprising the target message,
wherein highlighting the session comprising the target message in the second display area comprises at least one of:
pining the session comprising the target message to top;
displaying the session comprising the target message in a preset mode;
selecting, by default, the session comprising the target message.

17. The method of claim 1, wherein the session screening identification is determined based on following steps:
obtaining at least one session;
determining a notification strategy corresponding to each session based on an attribute value of a notification attribute of the at least one session, the notification strategy comprising a first notification strategy and a second notification strategy;
determining the session screening identification corresponding to each session according to the notification strategy corresponding to each session, and associating each session with the corresponding session screening identification;
wherein the session screening identification comprises a first session screening identification and a second session screening identification.

18. An electronic device, characterized by comprising:
one or more processors;
a memory for storing one or more programs, which, when executed by the one or more processors, cause the one or more processors to implement a method comprising:
displaying at least two session screening identifications in a first display area of a first message page, the at least two session screening identifications comprising: a first screening identification for indicating that a new message in a session is notified with a first notification strategy, and a second screening identification for indicating that a new message in the session is notified with a second notification strategy, wherein the first notification strategy is that all messages of the session are notified in real time, and the second notification strategy is that messages of the session meet a preset condition are notified in real time, and other messages that do not meet the preset condition are not notified in real time, and wherein the preset condition comprises at least one of: the new message having a predetermined character; a sender of the new message being a designated contact; the new message containing a designated keyword; and
displaying information of each session corresponding to a currently selected session screening identification in a second display area of a second message page.

19. A non-transitory computer-readable storage medium having a computer program stored thereon, characterized in that, the program, when executed by a processor, implements the method comprising:

displaying at least two session screening identifications in a first display area of a first message page, the at least two session screening identifications comprising: a first screening identification for indicating that a new message in a session is notified with a first notification strategy, and a second screening identification for indicating that a new message in the session is notified with a second notification strategy, wherein the first notification strategy is that all messages of the session are notified in real time, and the second notification strategy is that messages of the session meet a preset condition are notified in real time, and other messages that do not meet the preset condition are not notified in real time, and wherein the preset condition comprises at least one of: the new message having a predetermined character; a sender of the new message being a designated contact; the new message containing a designated keyword; and displaying information of each session corresponding to a currently selected session screening identification in a second display area of a second message page.

\* \* \* \* \*